United States Patent [19]

Kawaguchi et al.

[11] Patent Number: 5,557,771
[45] Date of Patent: Sep. 17, 1996

[54] DATA PROCESSING SYSTEM AND STORAGE DEVICE AND AUXILIARY MEMORY BITS FOR CONTROLLING DATA PROTECTION IN THE STORAGE DEVICE

[75] Inventors: Atsuo Kawaguchi; Hiroshi Motoda, both of, Saitama-ken, Japan

[73] Assignee: Hitachi, Ltd., Tokyo, Japan

[21] Appl. No.: 39,761

[22] Filed: Mar. 30, 1993

Related U.S. Application Data

[63] Continuation-in-part of Ser. No. 801,351, Dec. 2, 1991, Pat. No. 5,253,212.

[30] Foreign Application Priority Data

Dec. 1, 1990 [JP] Japan .................................. 2-400077
Mar. 30, 1992 [JP] Japan .................................. 4-073681

[51] Int. Cl.⁶ ................................................. G06F 12/14
[52] U.S. Cl. .............. 395/490; 395/182.05; 364/DIG. 1; 364/265.3; 364/269.2
[58] Field of Search ............................ 364/200 MS File, 364/900 MS File; 395/400, 425, 490, 491, 474, 479, 182.5

[56] References Cited

U.S. PATENT DOCUMENTS

| | | | |
|---|---|---|---|
| 4,821,240 | 4/1989 | Nakamura et al. | 365/228 |
| 5,182,805 | 1/1993 | Campbell | 395/650 |
| 5,375,225 | 12/1994 | Dean et al. | 395/500 |

Primary Examiner—Eddie P. Chan
Assistant Examiner—Hiep T. Nguyen
Attorney, Agent, or Firm—Antonelli, Terry, Stout & Kraus

[57] ABSTRACT

This invention relates to the data processing system which provides, for example, data protection in units smaller than the page or the segment in a more flexible form without causing a marked decrease in efficiency. The conventional data word array has added thereto auxiliary memory bit array and a control unit, such that when a data word is read or updated, the execution of the program is interrupted according to the value of an auxiliary memory bit and a predetermined procedure is called. In this way, the set value of the auxiliary memory bit is used to specify that the processing is to be interrupted each time a data word with the set bit value is read or written.

25 Claims, 12 Drawing Sheets

R : FOR R=1, READING INTERRUPTED IMMEDIATELY

R' : FOR R' =1, PROCESSING INTERRUPTED AFTER COMPLETION OF READING

W : FOR W=1, WRITING INTERRUPTED IMMEDIATELY

W' : FOR W' =1, PROCESSING INTERRUPTED AFTER COMPLETION OF WRITING

FIG. 5A

PAGE TABLE (17)

| PAGE NO. | READ PERMISSION | WRITE PERMISSION | READ EXCEPTION | WRITE EXCEPTION (18) |
|---|---|---|---|---|
| | * | * | ● | ● |

FIG. 5B

READ EXCEPTION TABLE (19)

| ADDRRESS | PERMISSION | |
|---|---|---|
| | USER | PROGRAM |
| a0 | u0 | pr0, pr1 (21) |
| a0 | u1 | pr2 (22) |

FIG. 5C

WRITE EXCEPTION TABLE (20)

| ADDRRESS | PERMISSION | |
|---|---|---|
| | USER | PROGRAM |
| a0 | u0 | pr0 (23) |
| a1 | u2 | * (24) |
| a2 | u3 | * (25) |

R : FOR R=1, READING INTERRUPTED IMMEDIATELY

R' : FOR R'=1, PROCESSING INTERRUPTED AFTER COMPLETION OF READING

W : FOR W=1, WRITING INTERRUPTED IMMEDIATELY

W' : FOR W''=1, PROCESSING INTERRUPTED AFTER COMPLETION OF WRITING

FIG. 10A

PAGE TABLE 51

| PAGE NO. | READ PERMISSION | WRITE PERMISSION | READ EXCEPTION | WRITE EXCEPTION |
|---|---|---|---|---|
| j | * | * | | ● 52 |

FIG. 10B

WRITE EXCEPTION TABLE 53

| ADDRRESS | RELATION TO BE MAINTAINED | |
|---|---|---|
| | ADDRESS | MAINTENANCE PROCEDURE |
| aX | aY | [aY] ← [aX]+3 |
| aY | aX | [aX] ← [aY]−3 |

54 — aX row
55 — aY row

FIG. 13A

PAGE TABLE — 68

| PAGE NO. | READ PERMISSION | WRITE PERMISSION | READ EXCEPTION | WRITE EXCEPTION |
|---|---|---|---|---|
| | | | | |
| j | * | * | ● | ● |
| | | | | |

READ EXCEPTION TABLE — 70

| ADDRRESS | RELATION TO BE MAINTAINED | |
|---|---|---|
| | ADDRESS | MAINTENANCE PROCEDURE |
| aX | aY | [aX] ← [aY]−3  SET 0 FOR AUXILIARY MEMORY BIT R AT aX — 74 |
| aY | aX | [aY] ← [aX]+3  SET 0 FOR AUXILIARY MEMORY BIT R AT aY — 75 |

FIG. 13C

WRITE EXCEPTION TABLE — 71

| ADDRRESS | RELATION TO BE MAINTAINED | |
|---|---|---|
| | ADDRESS | MAINTENANCE PROCEDURE |
| aX | aY | SET 1 FOR AUXILIARY BIT R AT aY AND 0 FOR AUXILIARY BIT R AT aX — 72 |
| aY | aX | SET 1 FOR AUXILIARY BIT R AT aX AND 0 FOR AUXILIARY BIT R AT aY — 73 |

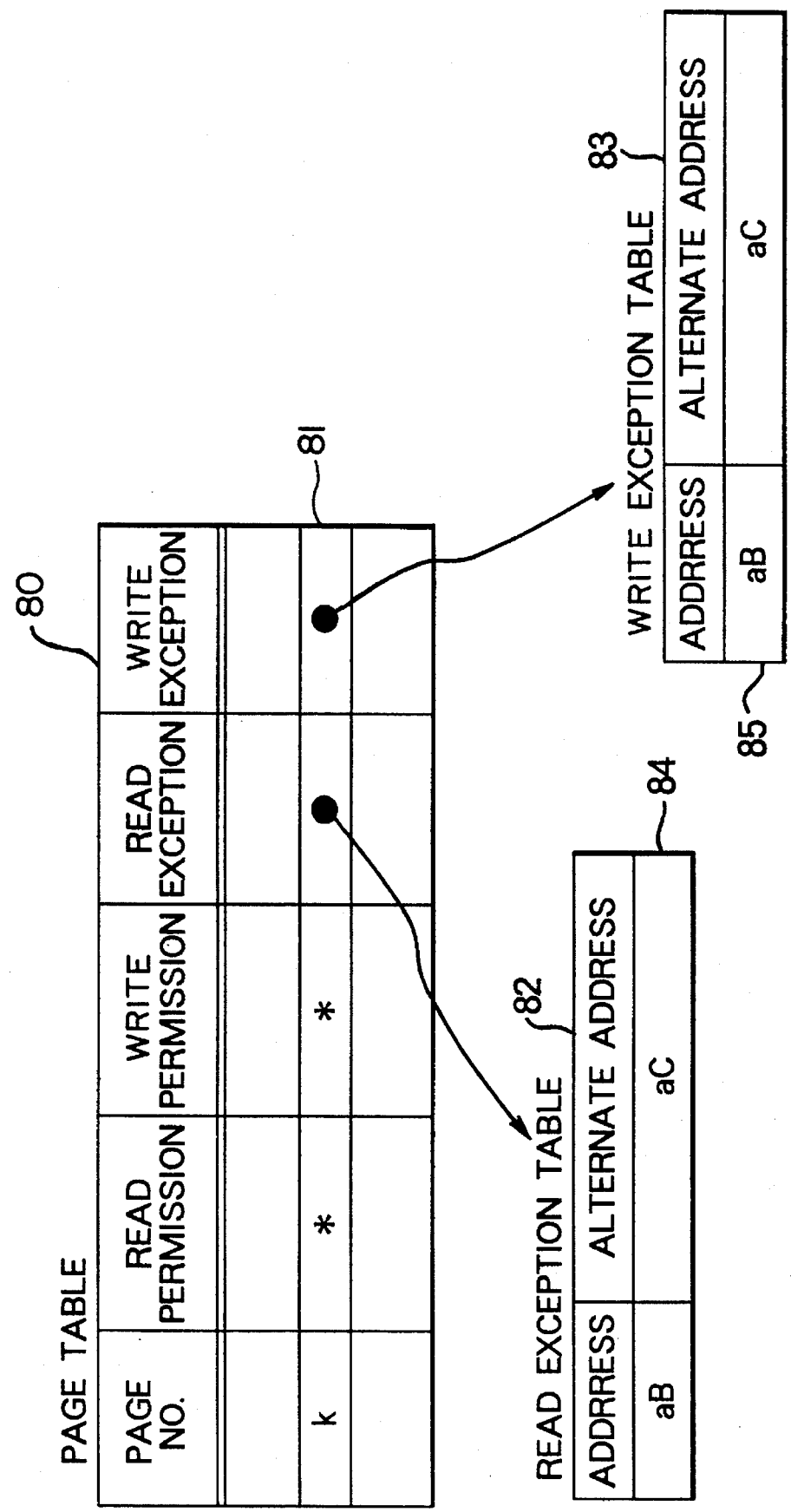

1

DATA PROCESSING SYSTEM AND STORAGE DEVICE AND AUXILIARY MEMORY BITS FOR CONTROLLING DATA PROTECTION IN THE STORAGE DEVICE

CROSS-REFERENCE TO RELATED APPLICATION

This is a continuation-in-part of U.S. application Ser. No. 07/801,351, entitled "SEMICONDUCTOR MEMORY IC AND SEMICONDUCTOR MEMORY DEVICE", filed on Dec. 2, 1991, now is U.S. Pat. No. 5,253,212, the disclosure of which is hereby incorporated by reference.

BACKGROUND OF THE INVENTION

This invention relates to a data processing system having a memory unit with auxiliary memory bits, and also to the protection and management of data used therein.

In the conventional data processing system, unique addresses are assigned, in numeric value, to individual data words. That is, an aggregate of data words is, in other words, an aggregate of addresses, constituting an address space. Moreover, the conventional data processing system circumvents the capacity limitations of the virtual memory by use of the real memory method, and serves as a system that can be used by a plurality of users without interference with one another through the provision of the data protection device to restrict the use of the memory unit by authorizing some program and user to use a data word.

In the virtual memory method, the virtual memory space and the real memory space are managed in units of continuous data words generally referred to as a page or a segment. The page and the segment are also used as the management units in the data protection device, and data protection information and authority to use are set for each page or segment.

SUMMARY OF THE INVENTION

Therefore, in the conventional data processing system, it is impossible to set data protection information in units smaller than the page or the segment, that is, in units of one word or an arbitrary number of data words.

The present invention has as its object to dispel the above-mentioned limitations to the management units of data words and to realize a useful function such as data protection in smaller units than the page or the segment in a more flexible manner without causing a marked decrease in efficiency.

The above object can be achieved by a facility which supervises the read and write processes of the data processor at every one data word or every certain number of data words on the memory unit, to be more specific, by a facility which has one or more auxiliary memory bits provided for every data word or for every arbitrary number of data words, and when the data processor is about to read or write the value of a data word, interrupts the processing of the data processor according to the value of auxiliary memory bits corresponding to the read or write operation and starts a predetermined process.

In the memory unit according to the present invention, one or more auxiliary memory bits are provided which accompany one or an arbitrary number of data words, and when the data processor is going to read or write the value of a data word, the processing of the data processor is interrupted according to the value of the corresponding auxiliary memory bit, and a predetermined process is started. In this process in which by referring to data management information in the memory managing and processing part of the operating system, a decision is made whether to interrupt or continue the read or update operation, and in this way, the use of data can be limited in units of one or an arbitrary number of data words by a process.

BRIEF DESCRIPTION OF THE DRAWINGS

FIGS. 5A to 5C show tables of data protection information;

FIGS. 10A and 10B show tables of separate data relating information using write exception;

FIGS. 13A to 13C show tables of separate data relating information using both read and write exceptions;

FIG. 15 shows tables of information about substitution for a defective data word.

DESCRIPTION OF THE PREFERRED EMBODIMENT

An embodiment of the present invention will be described with reference to the accompanying drawings.

Figure 1:
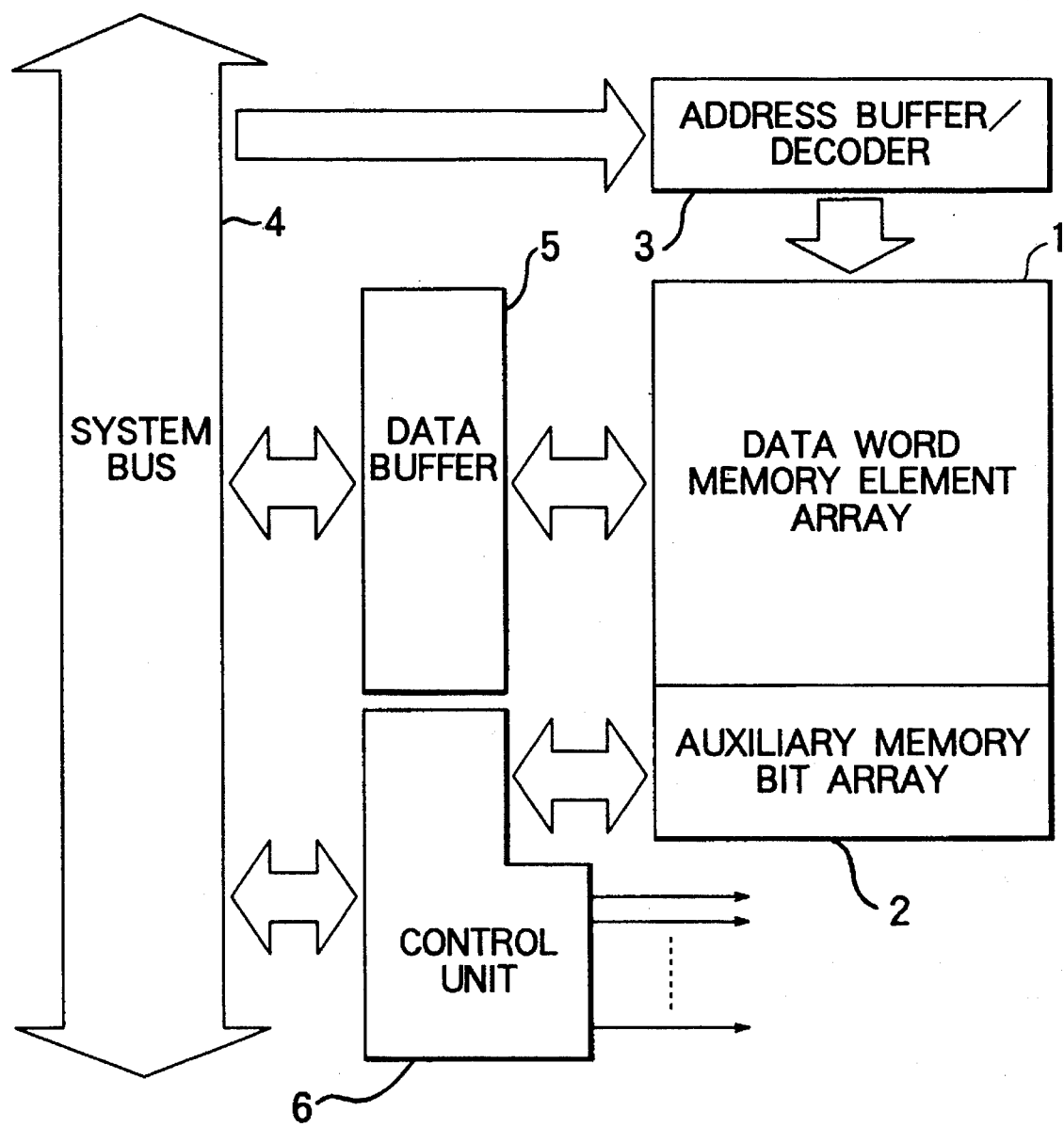
FIG. 1 is a block diagram of an embodiment of the present invention.

FIG. 1 is a block diagram of the memory unit according to an embodiment of the present invention. Numeral 1 denotes a data word memory element array, 2 denotes an auxiliary memory bit array, and 3 denotes an address buffer/decoder. For example, an arithmetic processing unit, not shown, selects a data word corresponding to an address which it specifies through a system bus and an auxiliary memory bit which accompanies the data word. Numeral 5 denotes a data buffer through which data is transferred between the data word memory device array 1 and the system bus 4. Numeral 6 denotes a control unit which generates timing signals necessary for the operation of the respective blocks mentioned above. The control unit also checks the values of the auxiliary memory bits, and according to the set value, sends a processing interruption signal to the system bus 4.

Figure 2:
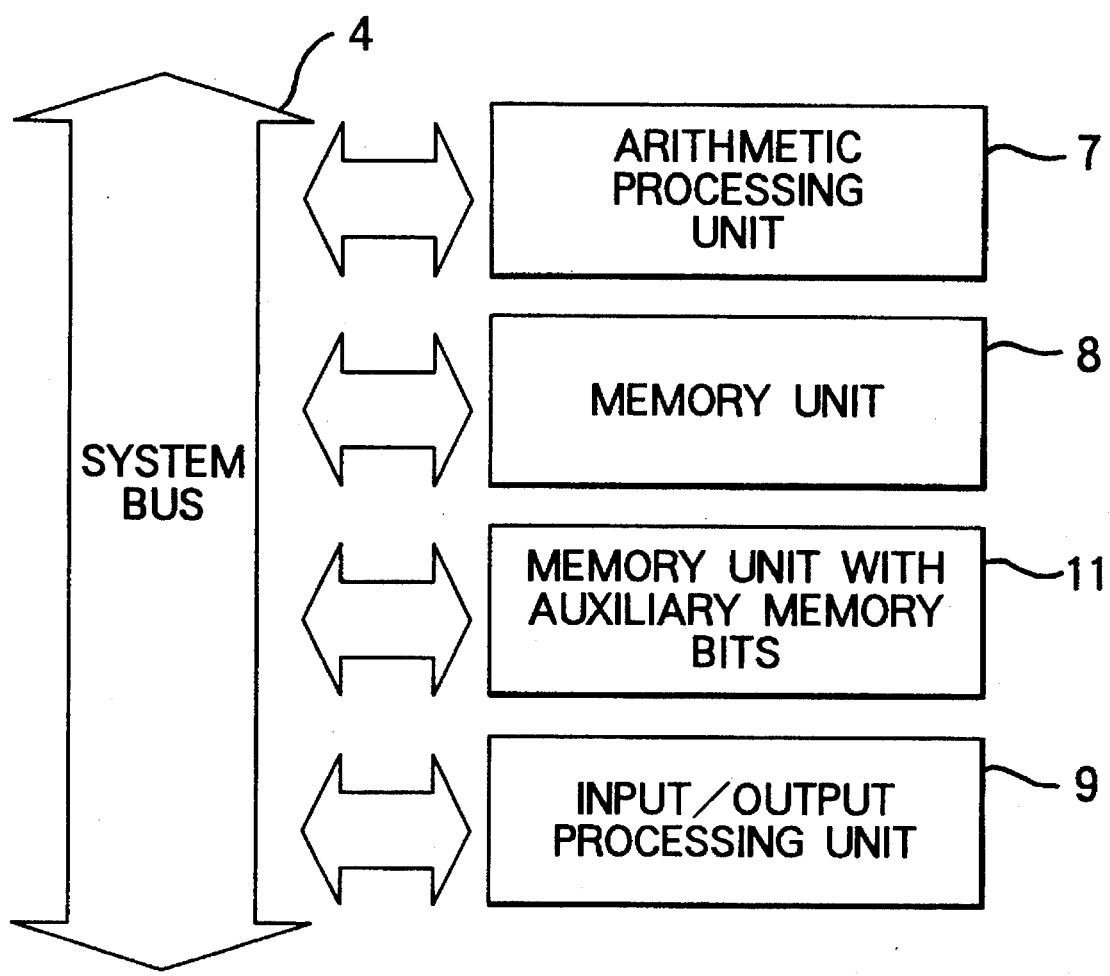
FIG. 2 is a block diagram of an example of data processing system using the embodiment of the present invention.

FIG. 2 is a block diagram of the data processing system according to an embodiment of the present invention. Numeral 7 denotes an arithmetic processing unit, 8 denotes a memory unit for storing programs and data, 9 denotes an input/output processing unit, and 4 denotes a system bus through which data and control signals are transferred among those units. This system structure having the units thus far mentioned in this figure is substantially the same as in the conventional data processing system. This embodiment, however, is formed by adding thereto a memory unit 11 with auxiliary memory bits, and the memory unit 11 comprises the data word memory device array 1, the auxiliary memory bit array 2, the address buffer/decoder 3, the system bus 4, the data buffer 5, and the control unit 6. The memory unit 11, being a memory unit with auxiliary memory bits, has the same functions as the memory unit in an ordinary data processing system, and is used for storing programs and data. In the present invention, it is of course possible to make an arrangement in which all information is stored in the memory unit 11 with auxiliary memory bits without providing the memory unit 8.

Figure 3:
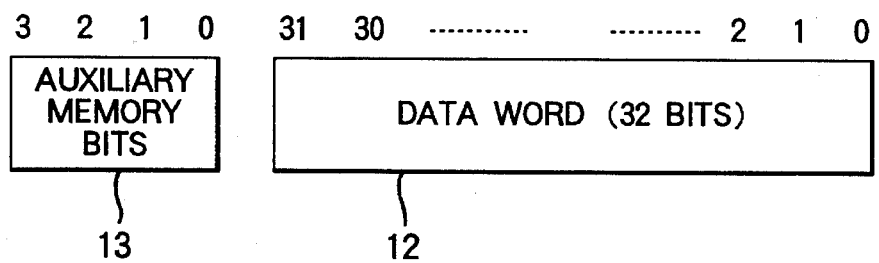
FIG. 3 is a diagram showing a data word in the example of data processing system.

In the system in FIG. 2, the arithmetic processing unit 7 handles data words which are each 32 bits long, and transfers data to and from the memory unit 8, the memory unit 11 which uses auxiliary memory bits, and the input/output processing unit 9 in units of one data word. FIG. 3 shows the relation between one data word and auxiliary bits, and numeral 12 denotes one data word. As shown in FIG. 3, in this embodiment, one data word consists of 32 bits, from bit 0 to bit 31. Numeral 13 denotes auxiliary memory bits which accompany each one data word, and in this embodiment, each data word is accompanied by four auxiliary memory bits from bit 0 to bit 3.

Figure 4:
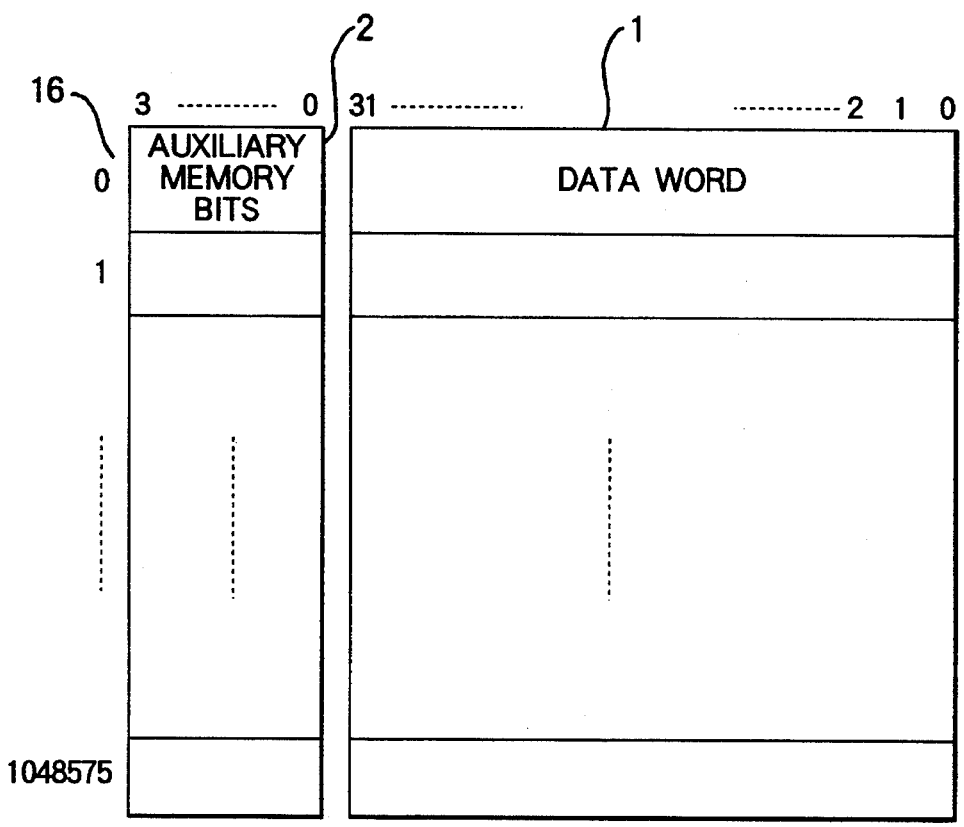
FIG. 4 is a diagram showing a data word memory device array and an auxiliary memory bit array in the memory unit with auxiliary memory bits.

In this embodiment, conceptually, the data word memory device array 1 and the auxiliary memory bit array 2 are formed by the arranging of one word and its accompanying auxiliary memory bits shown in FIG. 3. A unique address is given to each data word in the form of a numeric value. FIG. 4 shows how the data words and the auxiliary memory bits are arranged. Numeral 1 denotes the data word memory device array, and 2 denotes the auxiliary memory bit array formed by the auxiliary memory bits respectively accompanying the words. Numeral 16 denotes addresses given to the data words. In this embodiment, the data word memory device array 1 which is formed comprises 1048576 words. The total of the auxiliary memory bits is 4194304 (=1048576×4).

Figure 6:
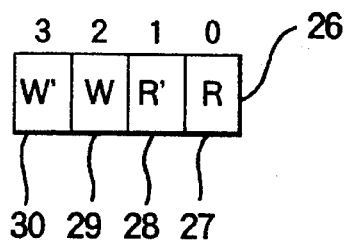
FIG. 6 is a diagram showing values of the auxiliary memory bits and their meanings.
Figure 7:
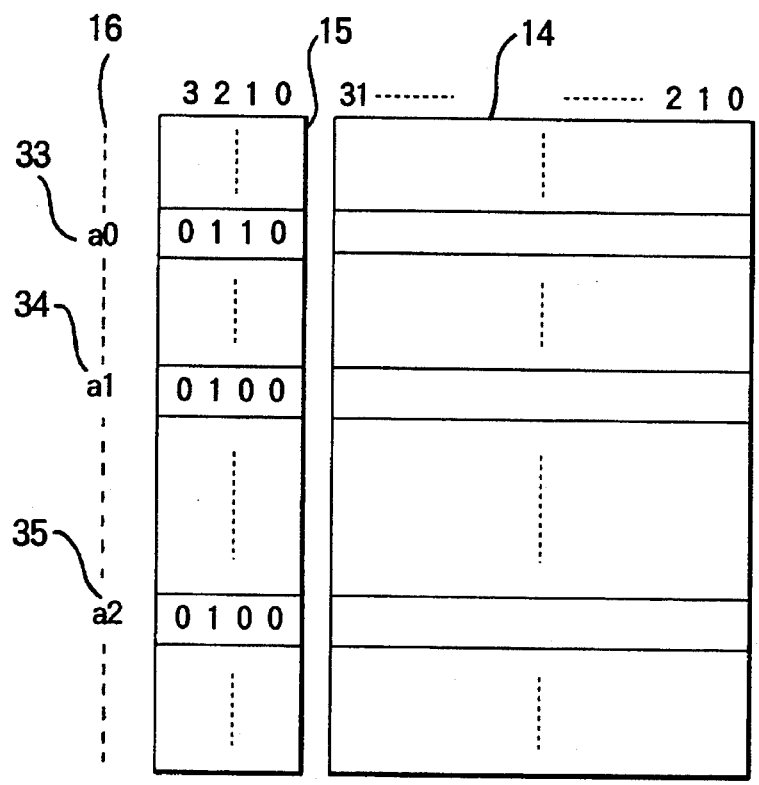
FIG. 7 is a diagram showing the setting of the auxiliary memory bits for data protection.

With reference to FIGS. 5, 6 and 7, the data protection in the system of this embodiment will be described. For this purpose, the setting is done for use in an example of data protection as follows. On a certain page, with regard to two given words, read permission is given to an arbitrary program being executed by an arbitrary user, but write permission is limited only to an arbitrary program being executed by a specific user. With regard to another one data word, read and write permission is given only to a specific program being executed by a specific user, and for all remaining data words, read and write permission is given to an arbitrary program being executed by an arbitrary user.

FIGS. 5A to 5C show data protection information corresponding to the above-mentioned example of setting, as represented in tables. In actuality, this information is stored in a machine readable form in the memory unit 8 or the memory unit 11 with auxiliary memory bits according to this embodiment. Numeral 17 denotes a table of pages, which table carries information about read and write permission for each page. Naturally, this table includes address conversion information or the like, which, however, is omitted because such information has no direct relation to the description here. Line 18 in the page table 17 concerns page i which is covered by data protection in this example of setting, and the * indicates that permission has been given to an arbitrary user or program. In other words, in the case of this example, an arbitrary user has permission to read and update page i.

The "Read exceptions" and "Write exceptions" in the page table 17 are the titles which indicate the tables showing the exceptions to data protection information in the page. Line 18 associated to the data protection information on the page i indicates tables showing exceptions to data protection information and, more specifically, exceptions to the read and update permission.

Numeral 19 is a read exceptions table carrying data protection information about exceptions to read permission, while 20 is a write exceptions table showing similar information with respect to writing. Line 21 in the read exceptions table indicates that read permission has been given only to the programs pr0 and pr1 executed by the user u0 for a data word at address a0. Further, at line 22, read permission has been given only to the program pr2 being executed by the user u1 to read the data word at the same address a0. Also, at line 23 in the write exceptions table, write permission has been given only to the program pr0 being executed by the user u0 to write the data at address a0, at line 24, write permission has been given to an arbitrary program of the user u2 on a data word at address a1, and at line 25, write permission has been given to an arbitrary program of the user u3 on a data word at address a2.

The permission described above will be itemized for clarity.

1. For data words on page i, read and update permission has been given to an arbitrary program being executed by an arbitrary user, but with some exceptions.

2. For a data word at address al on page i, write permission has been given to an arbitrary program being executed by a user u2.

3. For a data word at address a2 on page i, write permission has been given to an arbitrary program only when executed by a user u3.

4. For a data word at address a0 on page i, read permission has been given only to programs pr0 and pr1 being executed by a user u0 and a program pr2 being executed by a user u1. As for updating of the data word at address a0, permission has been given only to the program pr0 being executed by the user u0.

It will be known that data protection information corresponds to the example of setting as expressed above.

In this embodiment, an address is used to specify a data word, and a character string is used to specify a user or a program name. However, needless to say, an offset value in the page may be used instead of an address, and an identifier defined previously may be used instead of a character string of a user or a program name. Moreover, in forming a read exceptions table and a write exceptions table, a hash table can be used which uses the hash key for the address, the user or the program name, whereby retrieval can be increased in speed.

Further, in this embodiment, items to which permission is given are indicated in the page table, read exceptions table, and write exceptions table. However, it is possible to indicate items to which permission is not given or indicate both of the two opposite groups of items.

FIG. 6 shows the values of the auxiliary memory bits and their meanings. At the four auxiliary memory bits 26, if the value of bit 0 at 27 is 1, when the arithmetic processing unit 7 is about to read the data word accompanied by that auxiliary memory bit, a processing interruption signal is sent immediately to the arithmetic processing unit 7. If the value of bit 1 at 28 is 1, the read operation is first completed, and immediately after the completion of the read operation, an interruption signal is sent to the arithmetic processing unit 7. To be more specific about the sequence of events on the arithmetic processing unit 7, after it has finished the read operation, that is, has received the value of data word, the execution of the program is interrupted immediately. Similarly, if bit 2 at 29 is 1, when a write operation is about to take place, a processing interruption signal is sent immediately, and if bit 3 at 30 is 1, after an update operation has been finished, the execution of the program is interrupted. It ought to be noted that in this embodiment, no specification has been made as to what operation is to take place when both bits 0 and 1 are 1 at the same time, or when both bits 2 and 3 are 1 at the same time.

Incidentally, a device is provided which causes a sequence of steps to take place that when a procedure belonging to the operating system is in execution, the arithmetic processing unit 7 is in the privilege state, and in the read or write operation under this condition, the privilege state of the arithmetic processing unit 7 is notified to the memory unit 11 with auxiliary memory bits through a signal line on the system bus 4, and the current operation is completed regardless of the values of the auxiliary memory bits or the operation is completed according to the state of a register (not shown) in the control unit 6.

FIG. 7 is a diagram showing the setting of auxiliary memory bits for page i in this example of data protection. Numeral 15 denotes the arrangement of the auxiliary memory bit array 2 for page i, and 14 denotes the arrangement of the data word memory device array 1 for page i. At address a0 (at 33) in the address array 16, bit 1 in the auxiliary memory bits is set to 1 so that when a read operation is about to take place, a processing interruption signal can be sent after the read operation is completed, and on the other hand, bit 2 is set to 1 so that when a write operation is about to start, a processing interruption signal can be sent immediately without completing the update operation. With regard to addresses a1 (at 34) and a2 (at 35), bit 2 is set to 1 so that when, like in the above case, a write operation is about to take place, the processing can be interrupted immediately. With the above settings made, data protection can be achieved in units of one data word as intended, by following the procedure mentioned in the following.

Suppose a program pr0 is being executed by a user u0, when the pr0 is going to read a data word at address a0, since the read interruption bit 1 at 28 is set to 1, the value of the data word is sent to the arithmetic processing unit 7, but at the same time, a signal to interrupt the execution hereafter of the program is also sent. On receiving the value of the data word at address a0, the arithmetic processing unit 7 immediately interrupts the program pr0, and starts a read interruption procedure specified previously, i.e. determined in advance. The read interruption procedure calls the data protection procedure in the operating system, and the data protection procedure checks the program currently in execution and the user by referring to the data protection information shown in FIG. 5.

In this example, since read permission has been given to the program pr0 executed by the user u0, the data protection procedure and the read interruption procedure are finished, and the execution of the program pr0 is resumed from the point where the interruption occurred. In other words, the program pr0 can read the data word at address a0.

On the other hand, when another user u1 is executing the program pr0, like in the above case, just after the data word at address a0 is read, the processing is interrupted, and in the data protection procedure, it is clarified that the user u1 is not authorized to read. In this case, the operating system immediately terminates the execution of the program pr0. As a result, the program pr0 being executed by the user u1 is unable to use the value of the data word at address a0, so that the object of data protection could be achieved.

Further, when the program pr3 being executed by the user u2 is about to write the data word at address a1, as in the above case, the execution of the program is interrupted before the value of the data word is changed, and in the data protection procedure, a decision is made whether the program pr3 being executed by the user u2 is accessing the data word without authorization. In this case, since a proper authorization has been established, the operating system checks the state of the arithmetic processing unit and examines the program pr3 as necessity demands, and accordingly, determines the value to be updated as the data word at address a1, and actually writes it at address a1 (as mentioned above, the write operation by the operating system is not interrupted). Then, the execution of the program pr3 is resumed from the next instruction just after the write operation at address a1 which the program pr3 was to perform but did not carry out. After all, the data word at address a1 is updated as intended.

On the other hand, if the program pr3 being executed by a user u3 is going to write the data word at address a1, as mentioned above, the execution of the program is interrupted, and since in this case the user u3 is not authorized to update, the operating system terminates the execution of the program immediately. As a result, the user u3 is unable to update the value of the data word at address a1, so that the object of data protection could be achieved.

Figure 8:
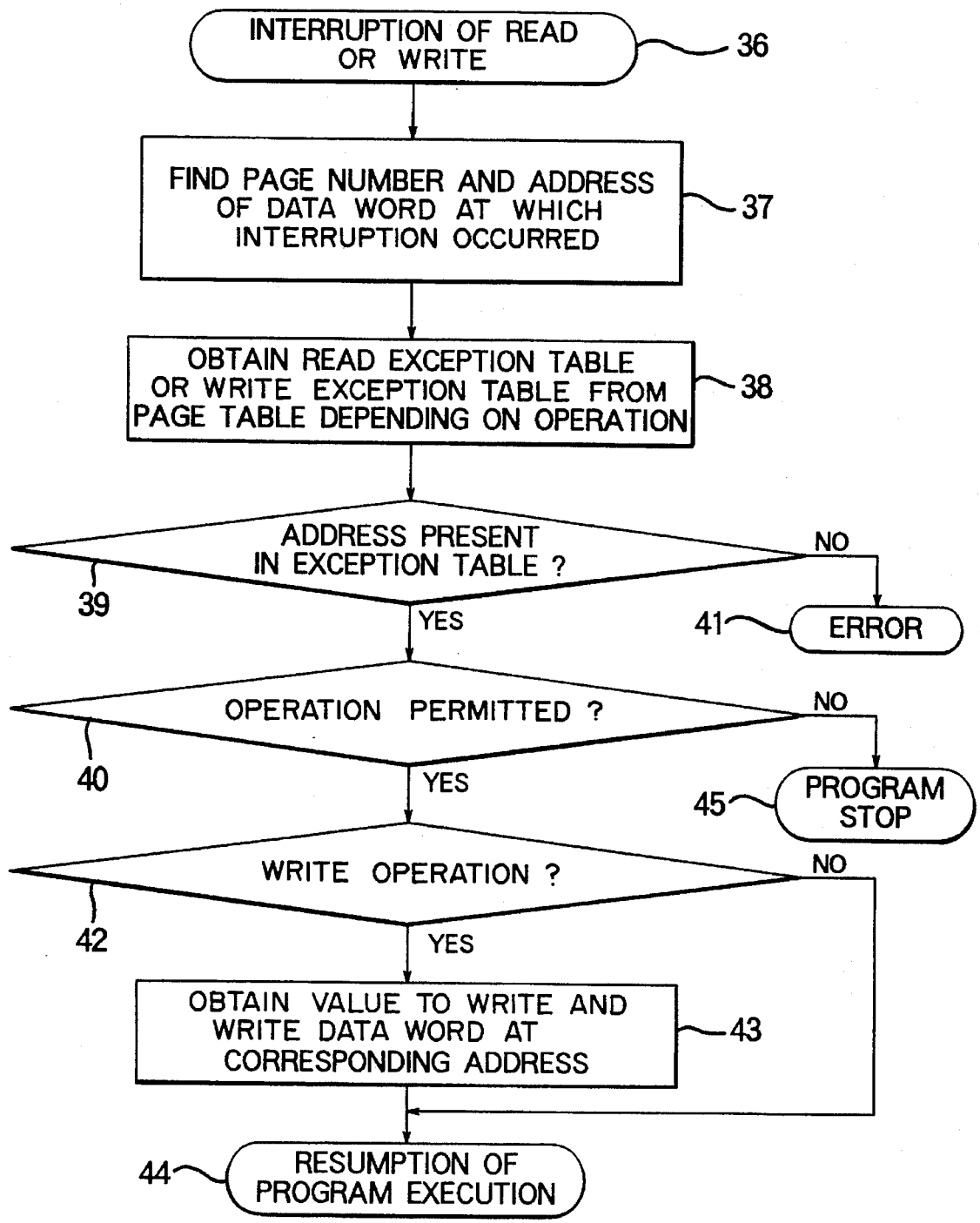
FIG. 8 is a diagram showing a flowchart of a data protection procedure.

FIG. 8 is a flowchart representing the data protection procedure which has been described. If a read or write operation is interrupted (step 36), the data protection procedure of the operating system is started. The page number and the address of the data word at which the interruption occurred are found (step 37). From the page table, the read exceptions table or the write exceptions table is obtained depending on whether the operation is to read or update (step 38). A checking is made as to whether the address of the data word at which the operation was interrupted exists in the exceptions table obtained (step 39), and if that address exists, it is ascertained whether that operation is permitted (step 40). If the above-mentioned address is not registered in the exceptions table, this means that there is an error in the data protection information or in the value of the auxiliary memory bit, so an error correction process (step 41) is carried out. If the operation is permitted and the operation is a write operation (step 42), a value to update is obtained, and the data word at that address is written (step 43). If the operation is a read operation, the step 43 is not performed. Finally, the execution of the program which was interrupted is resumed (step 44).

Referring to FIGS. 9 to 14, description will be made of the method of relating different items of data in the system in this embodiment. Herein, the term "relating" refers to a change of the related data when the value of some data is changed, to thereby maintain a fixed relation among a plurality of data values at all times.

Figure 9:
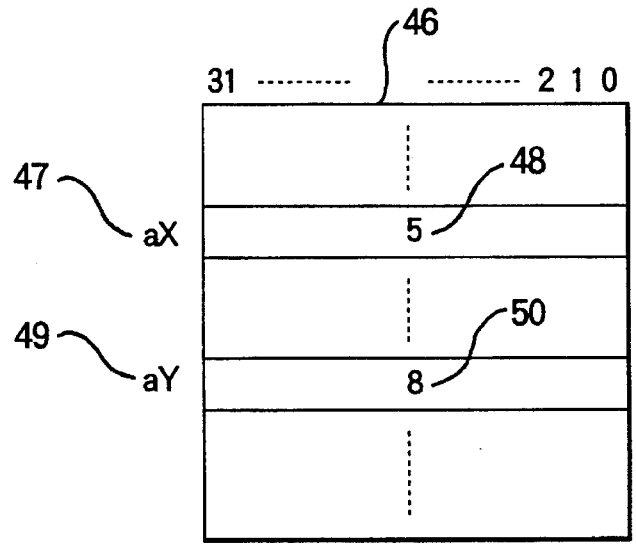
FIG. 9 is a diagram showing an example of how separate items of data are related to one another.

FIG. 9 shows an example of a method by which separate items of data are related in this embodiment. This example is used throughout the following description. Let us consider a case in which in a certain program, a relation 45 shown below must always be maintained for variables X and Y.

$$Y=X+3$$

For example, if the value of X is taken to be 4, then the value of Y must necessarily be 7 (=4+3). Conversely, if the value of Y is taken to be 5, then the value of X must necessarily be 2 (=5−3). If one data word each is assigned to the variables X and Y in the arrangement 46 of data words, this example can be said to have established a fixed relation between the value (48) of a data word at address aX (47) of the variable X and the value (50) of a data word at address aY (49).

In the conventional system, a relation between separate items of data as mentioned above has been achieved by writing a program in such a way that when the value of a variable is changed, the value of another related variable is also invariably changed. Therefore, in writing a large program or a complicated program, errors that the value of the other variable is not updated correctly are likely to enter, which has been a vexing problem.

FIGS. 10A and 10B show in a table form separate data relating information corresponding to the above-mentioned example. Like in the example (FIGS. 5A to 5C) of data protection information, this information is stored in machine readable form in the memory unit 8 or the memory unit 11 with auxiliary memory bits. Numeral 51 indicates a page table which carries information about read and update permission for the respective pages. Needless to say, address conversion information or the like is included in this table, which, however, is omitted since such information is not directly associated with the description here.

Line 52 in the page table 51 concerns page j containing data words at addresses aX (47) and aY (49), which are included in the process of relating separate items of data in this example. Like in the data protection mentioned above, information about permission is also carried in the page table, which, however, is omitted because this information is not directly connected with the following description.

Like in the example of data protection, the "Read exceptions" and "Update exceptions" in the page table 51 are the items indicating the tables to be referred to when the read or update operation is interrupted on page j.

Numeral 53 is an update exceptions table including information for relating separate items of data by using exceptions to the update permission, and this table comprises the addresses and the relations to be maintained. Line 54 indicates that when the data word at address aX (variable X) is updated, there is a relation to be maintained with address aY (variable Y), and in order to maintain this relation, the following updating is required.

$$[aY] \leftarrow [aX]+3$$

More specifically, 3 should be added to the value of the data word ([aX]) at address aX, that is to say, the value of the data word at address aY should be changed to the sum of this addition ([aY]). Similarly, line 55 indicates that when the data word at address aY (variable Y) is updated, the address aX (variable X) should be updated by the procedure shown below:

$$[aX] \leftarrow [aY]-3$$

In actuality, to specify the value of an address under the item of the relation to be maintained, a pointer to the address list is used, and likewise, to specify the value of a maintenance procedure, a pointer to the maintenance procedures is used. If a variable name or a procedure can be specified uniquely, there is no need to use pointers as the values of those items, and it goes without saying that character strings and arbitrary identifiers can be used. In this example, it is assumed that the addresses aX and aY are included in the same page, but even if those addresses are on different pages, by preparing different tables of update exceptions for separate pages, complete information for relating separate items of data can be provided.

Figure 11:
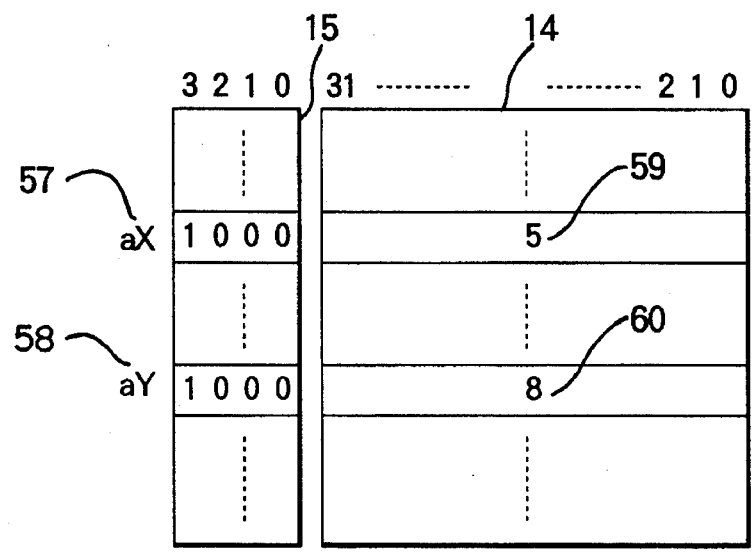
FIG. 11 is a diagram showing the setting of auxiliary memory bits for relation of data.

FIG. 11 shows the setting of values for auxiliary memory bits in this example of relating separate items of data. Like in the data protection, the setting for page j is indicated. In order that a processing interruption signal can be sent after completion of the write operation, 1 is set at bit 3 in the auxiliary memory bits at addresses aX (57) and aY (58). Data words 59 and 60 correspond to variables X and Y, respectively.

Based on the setting as described, two separate items of data are related by executing the procedure as follows. Suppose that the value of a variable X is changed while a program is being executed. This refers to, in other words, an updating of the data word at address aX. Since the value of the auxiliary memory bit 3 located at address aX is 1, the execution of the program is interrupted just after completion of the update operation, and like in the case of data protection, the update interruption procedure of the operating system is called, in which procedure the separate data relating procedure is started. In this example, as is obvious from the associated update exceptions table 53, it is necessary to execute the maintenance procedure at line 54 in order to maintain the relation with address aY. The separate data relating procedure executes the associated maintenance procedure in which the data word at address aY is written, that is, the value of the variable Y is changed, and after this, the execution of the program which has been interrupted is resumed. Since updating of the address aY is done by the update interruption procedure in the operating system, the write operation of the operating system is not interrupted as in the case of data protection described earlier. Conversely, when the value of the variable Y is changed, a data word at the address aX, that is, the value of the variable X is changed by following the same procedure. In the manner as described, the values of two items of data are related. It ought to be noted that though a case of relating two variables was taken as an example here, but needless to say, it is also possible to relate any number of variables if enough information for relating separate items of data has been registered in the update exceptions table.

Figure 12:
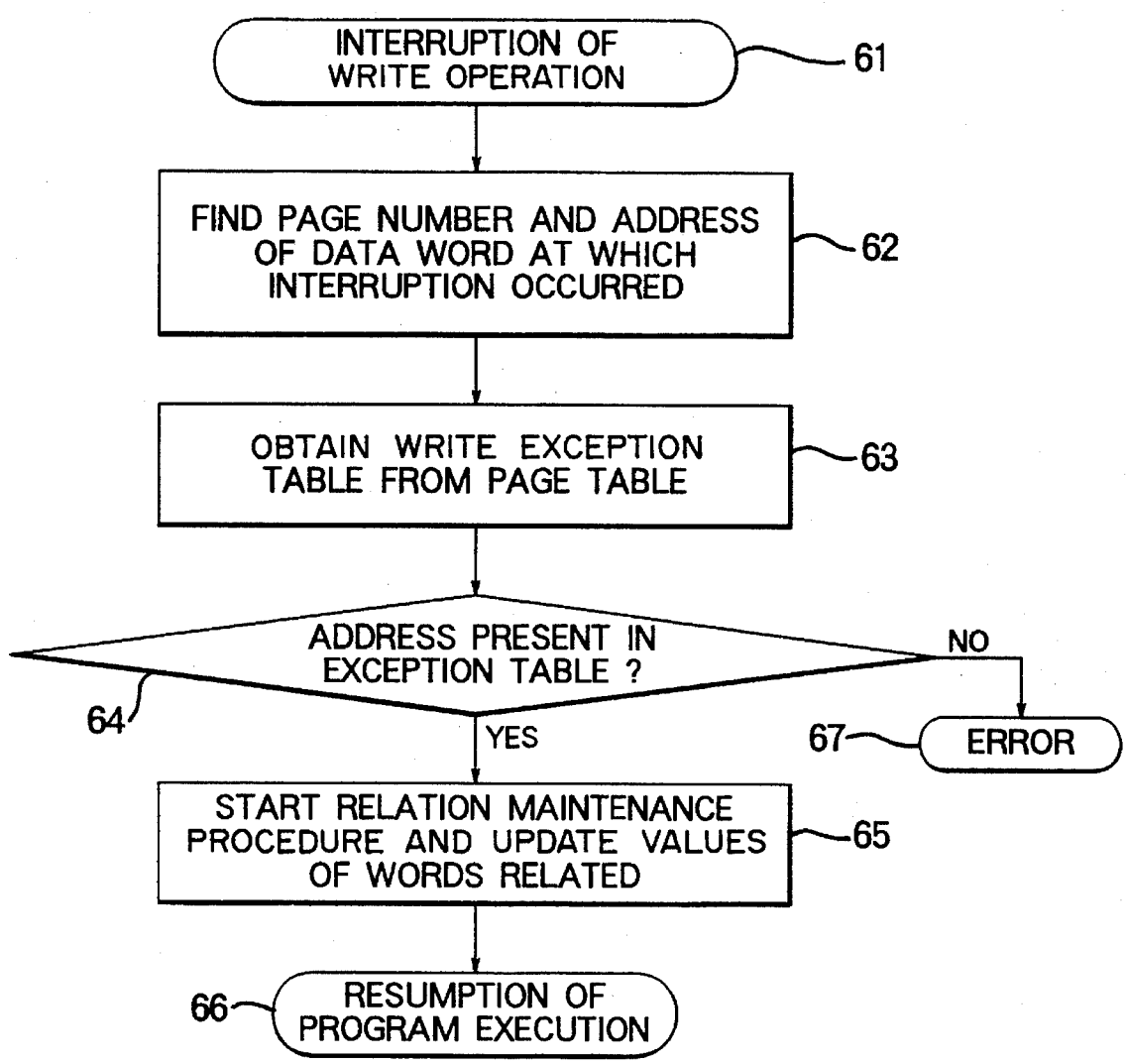
FIG. 12 is a diagram showing a flowchart of a separate data relating procedure.

FIG. 12 is a flowchart representing the steps of relating separate items of data, which has been described. If an update operation is interrupted (step 61), the separate data relating procedure is started. The address of the data word at which the interruption occurred and the associated page number are found (step 62), and the update exceptions table is obtained from the page table (step 63). A check is made in the exceptions table whether there is the address of the data word at which the operation was interrupted (step 64), and if there is, the procedure for maintaining the relation between data words is started to update the value of the related data word (step 65). Then, the execution of the interrupted program is resumed (step 66). On the other hand, if the address looked for has not been registered, it follows that there is an error in the data relating information or in the value of some auxiliary memory bit, and an error correction process is carried out (step 67).

In the foregoing data relating examples, only the interruption of the write operation has been used. However, by using a read operation interruption beside the write operation interruption, the same result of relating separate items of data can be achieved. This will be described in detail by using the same data relating formula (Y=X+3) used as an example before.

FIGS. 13A to 13C show the data relating information in a case in which in addition to an update operation interruption, a read operation interruption is also used. As described above, this information is stored in machine readable form in the memory unit 8 or the memory unit 11 with auxiliary memory bits. Numeral 68 denotes a page table, and carries information about read and write permission for every page. Naturally, address conversion information or the like which would be included is, however, omitted from this table since such information is not directly associated with the description here. Line 69 in the page table 68 concerns page j which includes data words at address aX (47) and address aY (49). Like in data protection described above, information about permission is also carried, which, however, is omitted because the permission information has no direction association with the description here.

Numeral 70 denotes the read exceptions table, while 71 denotes the update exceptions table, and each table contains addresses and relations to be maintained. Line 72 and line 73 are used when a data word is updated either at address aX (variable X) address aY (variable Y), respectively. For example, when a data word at address aX was updated, 1 is set at bit 0(R) at address aY in the auxiliary memory bit array 15, which is related to address aX, and 0 is set at bit 0(R) at address aX in the auxiliary memory bit array 15, at which address the update operation was interrupted. Conversely, if the data word at address aY was updated, 1 is set at bit 0(R) at address aX in the auxiliary memory bit array 15, while 0 is set at the same bit at address aY. In other words, 0 is set at bit 0(R) in the auxiliary memory bit array 15 for the data word updated, and 1 is set for the data word related to the data word updated.

Turning to the read operation, processing to be done when an interruption of the read operation occurred at address aX is described in line 74 in the read exceptions table 74, and a similar description is given for address aY in line 75 of the same table. When an interruption of the read operation occurred at address aX, a correct value at address aX is obtained based on the value at address aY at this point in time by using $$[aX] \leftarrow [aY]-3$$

On the other hand, when an interruption of the read operation occurred at address aY, similarly, a correct value of address aY at this point in time is obtained by using $$[aY] \leftarrow [aX]+3$$

In either case, 0 is set at bit 0(R) in the auxiliary memory bit array 15 at addresses where the read operation was interrupted.

Also in the process of relating separate items of data in which an interruption of the read operation is used, when the values at two data word addresses aX (57) and aY (58) are adequate, the set values at bits 0(R) in the auxiliary memory bit array 15 are the same as in FIG. 11.

Based on the settings mentioned above, relating separate items of data can be achieved by following the steps described in the following. Suppose the initial state is as shown in FIG. 11, that is, the value of the variable X is 5 and the value of Y is 8, and the relation between the two variables is maintained.

Also suppose that the value of the variable X, that is, a data word at address aX was changed to 7 during the execution of the program. Since the value of bit 3(W') is 1 at address aX in the auxiliary memory bit array 15, after the write operation is completed, the execution of the program is interrupted, and the write operation interruption procedure of the operating system is called, in which procedure the separate data relating procedure is started.

In this example, according to the maintenance procedure in line 72 to maintain the relation with the address aY in the relevant update exceptions table 71, 1 is set at bit 0(R) at address aY in the auxiliary memory bit array 15, and 0 is set at bit 0(R) at address aX in the auxiliary memory bit array 15. Then, the execution of the program is resumed. At this point in time, the value of the data word at address aY is not yet updated.

Figure 14:
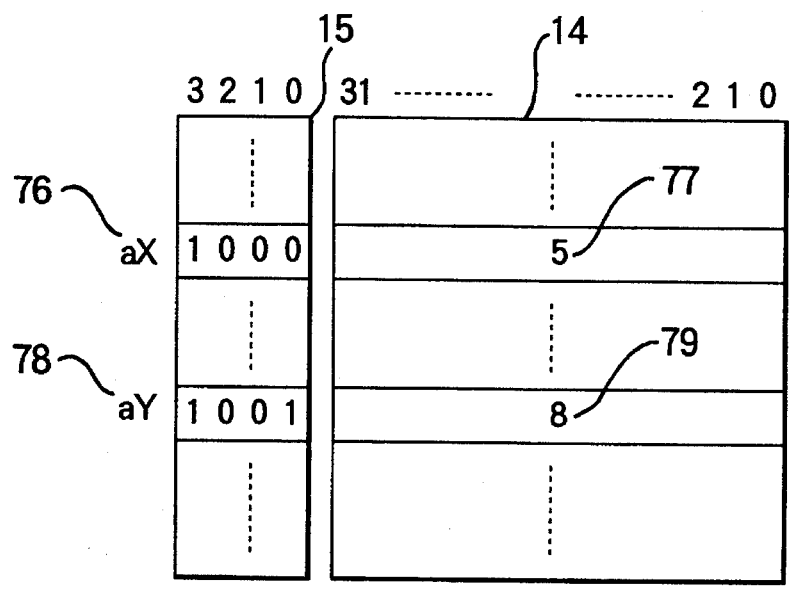
FIG. 14 is a diagram showing states of the auxiliary memory bit values in relating separate items of data using read exceptions.

FIG. 14 shows the set values at the auxiliary memory bits under the above-mentioned condition. The value at address aX (76) has been changed to 7 (77), so that the value of 8 (79) at address aY does not meet the relation (45) of Y=X+3. In other words, the value of address aY (78) is currently incorrect, and 1 is set at the auxiliary memory bit 0(R) to cause an interruption to occur when an operation to read the incorrect value is to take place.

If the data value at address aY (78) is about to be read as the program is executed thereafter, owing to the set value of 1 at the auxiliary memory bit R, the read operation is interrupted before the read operation is completed. Whereupon, the read operation interruption procedure and the separate data relating procedure of the operating system are started successively, then the relation maintaining procedure shown in line 75 of the read exceptions table 70 is started. In the relation maintenance procedure, a correct value is first calculated for data word at address aY, and the 1 at bit 0, by which the read operation was interrupted, is switched to 0. To be more specific, the data word is updated to a correct value, and then, the auxiliary memory bit is set so as not to cause a read interruption.

Finally, the execution of the program is resumed. Since the interruption resulted from the set value of the auxiliary memory bit R, the program is rerun starting with reading data at address aY (78). A correct value is now held at address aY, and 0 is set at the auxiliary memory bit 0, so that the read operation is finished without a hitch and the execution of the program continues.

On the other hand, after the value at address aX is changed (77), if the value is updated again at address aX, the separate data relating procedure to be executed when data is updated at address aX is started, and 1 is set at the auxiliary memory bit 0(R) at address aY, and 0 is set at the auxiliary memory bit 0(R) at address aX. Then the execution of the program is resumed. In this case, the value at address aY is still incorrect and, therefore, if this value is going to be read, this read operation is interrupted.

After the value at address aX (76) is changed, if the value at address aY (78) is also changed, as in the change of value done at address aX, the separate data relating procedure is started, 1 is set at the auxiliary memory bit 0(R) at address aX, and 0 is set at the auxiliary memory bit 0(R) at address aY, and then, the execution of the program is resumed. To be more specific, in this case, the above settings are done to cause the processing to be interrupted when the incorrect value at address aX is to about to be read. On the other hand, since the value at address aY is now regarded as correct, the auxiliary memory bits at address aY are set this time not to cause an interruption to occur in the read operation.

As has been described, in this method, 1 is set at the auxiliary memory bits 3(W') of two data words related to one another.

1 is set at the auxiliary memory bit 0(R) of a data word which is related to the other data word and whose value is incorrect.

In this way, actions are done which are equivalent to the separate data relating procedure marking a data word having an incorrect value, and calculating a correct value when it is required. Two variables have been used in the above description, but it goes without saying that if necessary and sufficient information for relating separate items of data is registered in the read and update exceptions table, it is possible to relate an arbitrary number of variables to one another.

Figure 16:
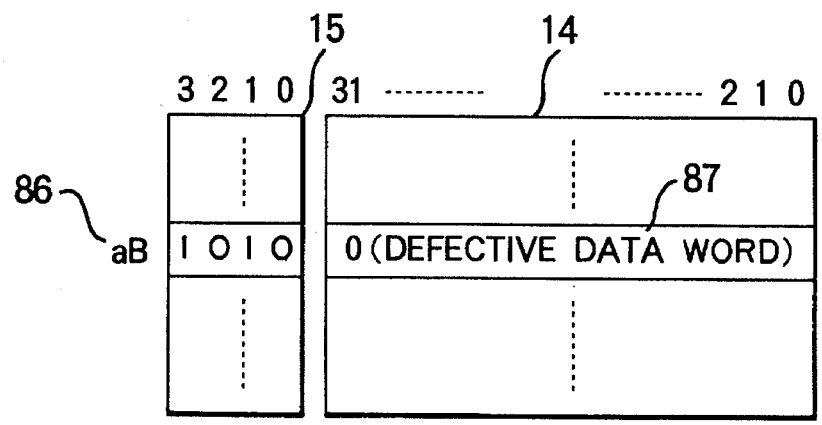
FIG. 16 is a diagram showing the setting of the auxiliary memory bit values in the case of substitution for a defective data word.

Referring to FIGS. 15 and 16, description will now be made of a method of substituting for a defective data word in the system according to this embodiment of the present invention. Substituting for a defective data word here means to substitute a data word which can hold data correctly by using some method for a data word having become unable to hold data correctly for some reason and to ensure the continuation of the operation of the system.

To take an example, when a data word at address aB is defective and its value always turns out to be 0 when it is read even though the data word is changed to any value, that is to say, when the part at address aB in memory has been destroyed, if the part at address aC can be substituted for the defective part and if the read or update operation to be carried out at address aB can be actually executed at address aC, the system can continue to operate normally. The precondition for the method to be described below is that the defective item is a data word only, and the memory unit 8 and the memory unit 11 with auxiliary memory bits operate normally or, more specifically, the update operation and the read operation proceed and end normally, with only one defect being that the value of that data word which is read out differs from the value which is written just before.

FIG. 15 show tables representing information about substitution for a defective data word, mentioned above. Like in the case of data protection information (FIG. 5), this information is stored in machine readable form in the memory unit 8 or the memory unit 11 with auxiliary memory bits. Numeral 80 denotes a page table, which shows information about read and update permission for each page. Naturally, address conversion information or the like is included in this table, which, however, is omitted since such information has no direct association with the description here. Line 81 in the page table 80 concerns page k including a defective data word at address aB. Like in the case of data protection mentioned earlier, permission information is also included in this table, which, however, is omitted because this information has no direct association with the description that follows.

The "Read exceptions" and "Write exceptions" in the page table 80 are the titles indicating tables to refer to when an interruption of a read or write operation occurred in a certain page. Numeral 82 and 83 denote tables of the read and write exceptions, and those tables indicate that when an interruption occurs in reading or writing a defective data word at address aB, the address aC is substituted for the address aB. It ought to be noted that in this example, separate tables are prepared for the read and update exceptions, but it is also possible to prepare a table including information about both read and write exceptions.

FIG. 16 shows the setting of the auxiliary memory bits in a case where another data word at another address is substituted for a defective data word. 1 is set at bit 1(R') and bit 3(W') in the auxiliary memory bit array 15 so that a processing interruption signal should be sent just after reading or writing a defective data word (87) at address aB (86) is completed.

With the above settings, an intended substitution for a defective data word at address aB can be achieved by executing the procedure as follows. When the program in execution is going to read a defective data word 87 at address aB, owing to the 1 set at the auxiliary memory bit 1(R'), the processing is interrupted just after completion of the read operation, and the read operation interruption procedure and the defective data word substitution procedure of the operating system are started and executed successively.

At this point in time, a wrong value has been sent to the arithmetic processing unit 7. The defective data word substitution procedure finds the address of an alternative data word from the read exceptions table, and also finds the destination of the value, which was read, by analyzing the interrupted program. The substitution procedure reads the value of the alternative data word, and sends it to the destination. In this way, the state is achieved which is equivalent to a correct value having been read, the execution of the interrupted program is resumed. Similarly, in updating a data word, too, a value to be updated is updated at an address of the alternative data word by the data word substitution procedure after an interruption of the update operation.

As described above, in this method, the object of substitution for a defective data word is achieved in such a way that an interruption occurs invariably in the operation of reading or writing a defective data word, and also, the defective data word substitution procedure, which is started subsequently, carries out an equivalent operation using an alternative data word, and then, the interrupted execution of the program is resumed. Though, in this example, substitution is carried out by interrupting the processing just after completion of the read or write operation, but needless to say, the same result can be obtained by interrupting the current operation immediately, the latter method being different in the way of resuming the execution of the program.

In all the examples mentioned above, this embodiment provides an auxiliary memory bit for every data word, but it is also possible to provide an auxiliary memory bit to correspond to a smaller number of bits, say, eight bits or any number of data words. This only changes the management units, but the operation remains the same. In the read and write exceptions table in FIGS. 5, 10 and 15, a unique form is used; however, various techniques can be used simultaneously, such as changing the way of handling lines according to the value of an identification item in the table, using such a data expression as a list or the like in the table, or using pointers to different forms in the page table.

According to the present invention, data protection, relating different items of data, or substitution for a defective data word can be implemented using a smaller unit than the page or the segment in a more flexible manner and without a marked decrease in efficiency.

We claim:

1. A data processing system comprising a memory unit with auxiliary memory bits and an address decoder for specifying an arbitrary number of data words and an arbitrary number of auxiliary memory bits in said memory unit, wherein each of said data words is accompanied by a same number of auxiliary memory bits such that when an arbitrary unit in said data processing system is about to perform one of reading and writing a value of a data word in said memory unit, specified by said address decoder, that one of a read and write operation to be performed is interrupted according to the value of one of the auxiliary memory bits, accompanying said data word, corresponding to said operation to be performed, whereupon said arbitrary unit starts a predetermined process, and wherein the value of said auxiliary memory bit, corresponding to said operation to be performed, controls selection of a setting for interruption from that including (i) a setting to interrupt the operation being performed prior to completion thereof, and (ii) a setting to interrupt that one of a new read and write operation to be performed before said new operation is started just after a preceding operation is completed.

2. A data processing system according to claim 1, wherein said memory unit with auxiliary memory bits includes a register capable of both controlling and stopping an interruption action to both the read and write operation and means for changing a value of said register by a unit in said data processing system, and wherein by changing the value of said register, the interruption action to that one of the read and write operation being performed on the memory unit can be both controlled and stopped.

3. A data processing system according to claim 1, wherein a table is included, which has registered therein addresses of data words, users, programs, and any component units in said data processing system that have authority to both read and write data words, wherein a value with which to interrupt a processing in both the read and write operation is recorded at said auxiliary memory bits of each data word at a registered address, and wherein when one of reading and writing of a data word at said registered address is about to be performed while said data processing system is operating, said processing is interrupted, and a check is made to see if a user, a program and any of said component units are authorized to effect that one of a read and write operation being performed at said data word, thus ensuring protection of data.

4. A data processing system according to claim 1, wherein a table is included which has a plurality of lines for registering information corresponding to data words in said memory unit with auxiliary memory bits, each line of said table having registered therein an address of one data word and a method of determining another address and a value of another related data word, corresponding to said another address, based on the value of said one data word, wherein a value with which to interrupt a processing when a data word is written is recorded at one of said auxiliary memory bits of each said data word at a registered address corresponding thereto, and wherein when a data word at a registered address is about to be written, the processing is interrupted, and the value of said another related data word is also updated by using the value determining method registered in said table, thus ensuring that the relation, as registered in said table, between the values of separate data words is maintained.

5. A data processing system according to claim 1, wherein a first table and a second table are included in which each has a plurality of lines for registering information corresponding to data words in said memory unit with auxiliary memory bits, each line of said first table having registered therein an address of one data word and an address of another related data word, each line of said second table having registered therein the address of said another related data word and a method of determining the value of said another related data word, wherein a value with which to interrupt a processing when a data word at said registered address is written is recorded in advance at one of said auxiliary memory bits of each data word at a registered address corresponding thereto, and when a data word at said registered address is about to be written while said data processing system is operating, the processing is interrupted, and the processing is continued by changing the value of a corresponding auxiliary memory bit of said another related data word registered in said first table to a value with which to interrupt the processing when said one data word is about to be read, and then when the value of said one data word whose auxiliary memory bit has been changed is about to be read, the processing is interrupted again, and a value is obtained for said another related data word by using said method of determining the value registered in the related line of said second table, and the value thus obtained is used as the value of said another related data word whose auxiliary memory bit has been changed, thereby maintaining the relation between the two data words.

6. A data processing system according to claim 1, wherein with regard to addresses of defective data words with the accompanying auxiliary memory bits thereof functioning normally, a table having registered therein addresses of said defective data words and addresses of alternative data words is provided, wherein a value with which to interrupt a processing when a defective data word is to be both read and written is recorded at one of said auxiliary memory bits of each defective data word at a registered address, and wherein when one of reading and writing a data word at said registered address of a defective data word is about to be performed while said data processing system is operating, the processing is interrupted, and said one of reading and writing is performed on a data word at an alternative address, registered in said table, as a substitute for the defective data word.

7. A data processing system comprising a memory unit with auxiliary memory bits and an address decoder for specifying an arbitrary number of data words and an arbitrary number of auxiliary memory bits in said memory unit, wherein each of said data words is accompanied by a same number of auxiliary memory bits such that when an arbitrary unit in said data processing system is about to perform one of reading and writing a value of a data word in said memory unit, specified by said address decoder, that one of a read and write operation to be performed is interrupted according to the value of one of the auxiliary memory bits, accompanying said data word, corresponding to said operation to be performed, whereupon said arbitrary unit starts a predetermined process, and wherein said memory unit with auxiliary memory bits includes a register for controlling and stopping an interruption action to both the read and write operation and means for changing a value of said register by a unit in said data processing system, whereby through changing the value of said register, the interruption action to that one of the read and write operation being performed on the memory unit can be both controlled and stopped.

8. A data processing system according to claim 7, wherein when said arbitrary unit in said data processing system is about to perform one of reading and writing a value of a data word including an updating thereof, just after that one of the read and write operation being performed is completed and before the start of such an operation with respect to a new data word, that one of a new read and update operation to be performed is interrupted according to the value of said register, accompanying said data word, corresponding to said operation to be performed, whereupon said arbitrary unit starts said predetermined process.

9. A data processing system comprising a memory unit with auxiliary memory bits and an address decoder for specifying an arbitrary number of data words and an arbitrary number of auxiliary memory bits in said memory unit, wherein each of said data words is accompanied by a same number of auxiliary memory bits such that when an arbitrary unit in said data processing system is about to perform one of reading and writing as well as updating a value of a data word in said memory unit, specified by said address decoder, that one of a read and write operation to be performed is interrupted according to the value of one of the auxiliary memory bits, accompanying said data word, corresponding to said operation to be performed, whereupon said arbitrary unit starts a predetermined process, and wherein a table is included, which has registered therein addresses of data words, users, programs, and any component units in said data processing system that have authority to both read and update data words, in which a value with which to interrupt a processing in both the read and write operation is recorded at said auxiliary memory bits of each data word at a registered address such that when one of reading and writing of a data word at said registered address is about to be performed while said data processing system is operating, said processing is interrupted, and a check is made by using said table to see if a user, a program and any of said component units of said data processing system are authorized to effect that one of a read and write operation being performed of said data word, thus ensuring protection of data.

10. A data processing system according to claim 9, wherein when said arbitrary unit in said data processing system is about to perform one of reading and updating a value of a data word, just after that one of the read and update operation being performed is completed and before the start of such an operation with respect to a new data word, that one of a new read and update operation to be performed is interrupted according to the value of the address, registered in said table, of said data word, corresponding to said operation to be performed, whereupon said arbitrary unit starts said predetermined process.

11. A data processing system according to claim 10, wherein said arbitrary unit has a special state, said arbitrary unit being notified, by a signal line, that said arbitrary unit is in said special state, thereby effecting one of controlling and stopping an interruption action of that one of the read and update operation being performed on said memory unit with auxiliary memory bits.

12. A data processing system according to claim 9, wherein said arbitrary unit has a special state, said arbitrary unit being notified, by a signal line, that said arbitrary unit is in said special state, thereby effecting one of controlling and stopping an interruption action of that one of the read and write operation being performed on said memory unit with auxiliary memory bits.

13. A data processing system comprising a memory unit with auxiliary memory bits and an address decoder for specifying an arbitrary number of data words and an arbitrary number of auxiliary memory bits in said memory unit, wherein each of said data words is accompanied by a same number of auxiliary memory bits such that when an arbitrary unit in said data processing system is about to perform one of reading and writing a value of a data word in said memory unit, specified by said address decoder, that one of a read and write operation to be performed is interrupted according to the value of one of the auxiliary memory bits, accompanying said data word, corresponding to said operation to be performed, whereupon said arbitrary unit starts a predetermined process, and wherein a table is included which has a plurality of lines for registering information corresponding to data words in said memory unit with auxiliary memory bits, each line of said table having registered therein an address of one data word and a method of determining another address and a value of another related data word, corresponding to said another address, based on the value of said one data word, in which a value with which to interrupt a processing when a data word is written is recorded at one of said auxiliary memory bits of each said data word at a registered address corresponding thereto such that when a data word at a registered address is about to be written, the processing is interrupted, and the value of said another related data word is updated by using the value determining method registered in said table, thus ensuring that the relation, as registered in said table, between the values of separate data words is maintained.

14. A data processing system according to claim 13, wherein when said arbitrary unit in said data processing system is about to perform one of reading and writing a value of a data word including an updating thereof, just after that one of the read and write operation being performed is completed and before the start of such an operation with respect to a new data word, that one of a new read and write operation to be performed is interrupted according to the value of the address, registered in said table, of said data word, corresponding to said operation to be performed, whereupon said arbitrary unit starts said predetermined process.

15. A data processing system according to claim 14, wherein said arbitrary unit has a special state, said arbitrary unit being notified, by a signal line, that said arbitrary unit is in said special state, thereby effecting one of controlling and stopping an interruption action of that one of the read and update operation being performed on said memory unit with auxiliary memory bits.

16. A data processing system according to claim 13, wherein said arbitrary unit has a special state, said arbitrary unit being notified, by a signal line, that said arbitrary unit is in said special state, thereby effecting one of controlling and stopping an interruption action of that one of the read and write operation being performed on said memory unit with auxiliary memory bits.

17. A data processing system comprising a memory unit with auxiliary memory bits and an address decoder for specifying an arbitrary number of data words and an arbitrary number of auxiliary memory bits in said memory unit, wherein each of said data words is accompanied by a same number of auxiliary memory bits such that when an arbitrary unit in said data processing system is about to perform one of reading and writing a value of a data word in said memory unit, specified by said address decoder, that one of a read and write operation to be performed is interrupted according to the value of one of the auxiliary memory bits, accompanying said data word, corresponding to said operation to be performed, whereupon said arbitrary unit starts a predetermined process, wherein a first table and a second table are included in which each has a plurality of lines for registering information corresponding to data words in said memory unit with auxiliary memory bits, each line of said first table having registered therein an address of a data word and an address of another related data word, each line of said second table having registered therein the address of said another related data word and a method of determining the value of said another related data word, and wherein a value with which to interrupt a processing when a data word at said registered address is written is recorded in advance at one of said auxiliary memory bits of each data word at a registered address corresponding thereto, and when a data word at said registered address is about to be written while said data processing system is operating, the processing is interrupted, and the processing is continued by changing the value of a corresponding auxiliary memory bit of said another related data word registered in said first table to a value with which to interrupt the processing when said one data word is about to be read, and then when the value of said one data word whose auxiliary memory bit has been changed is about to be read, the processing is interrupted again, and a value is obtained for said another related data word by using said method of determining the value registered in the related line of said second table, and the value thus obtained is used as the value of said another related data word whose auxiliary memory bit has been changed, thereby maintaining the relation between the two data words.

18. A data processing system according to claim 17, wherein when said arbitrary unit in said data processing system is about to perform one of reading and writing a value of a data word including an updating thereof, just after that one of the read and write operation being performed is completed and before the start of such an operation with respect to a new data word, that one of a new read and write operation to be performed is interrupted according to the value of one of the auxiliary memory bits, accompanying said data word, corresponding to said operation to be performed, whereupon said arbitrary unit starts said predetermined process.

19. A data processing system according to claim 18, wherein said arbitrary unit has a special state, said arbitrary unit being notified, by a signal line, that said arbitrary unit is in said special state, thereby effecting one of controlling and stopping an interruption action of that one of the read and update operation being performed on said memory unit with auxiliary memory bits.

20. A data processing system according to claim 17, wherein said arbitrary unit has a special state, said arbitrary unit being notified, by a signal line, that said arbitrary unit is in said special state, thereby effecting one of controlling and stopping an interruption action of that one of the read and write operation being performed on said memory unit with auxiliary memory bits.

21. A data processing system comprising a memory unit with auxiliary memory bits and an address decoder for specifying an arbitrary number of data words and an arbitrary number of auxiliary memory bits in said memory unit, wherein each of said data words is accompanied by a same number of auxiliary memory bits such that when an arbitrary unit in said data processing system is about to perform one of reading and writing a value of a data word in said memory unit, specified by said address decoder, that one of a read and write operation to be performed is interrupted according to the value of one of the auxiliary memory bits, accompanying said data word, corresponding to said operation to be performed, whereupon said arbitrary unit starts a predetermined process, wherein with regard to addresses of defective data words with the accompanying auxiliary memory bits thereof functioning normally, a table having registered therein addresses of said defective data words and addresses of alternative data words is provided, wherein a value with which to interrupt a processing when a defective data word is to be both read and written is recorded at one of said auxiliary memory bits of each defective data word at a registered address, and wherein when one of reading and writing a data word at said registered address of a defective data word is about to be performed while said data processing system is operating, the processing is interrupted, and said one of reading and writing is performed on a data word at an alternative address, registered in said table, as a substitute for the defective data word.

22. A data processing system according to claim 21, wherein when said arbitrary unit in said data processing system is about to perform one of reading and writing a value of a data word, just after that one of a read and write operation being performed is completed and before the start of such an operation with respect to a new data word, that one of a new read and write operation to be performed is interrupted according to the value of one of the auxiliary memory bits, accompanying said data word, corresponding to said operation to be performed, whereupon said arbitrary unit starts said predetermined process.

23. A data processing system according to claim 22, wherein said arbitrary unit has a special state, said arbitrary unit being notified, by a signal line, that said arbitrary unit is in said special state, thereby effecting one of controlling and stopping an interruption action of that one of the read and update operation being performed on said memory unit with auxiliary memory bits.

24. A data processing system according to claim 21, wherein said arbitrary unit has a special state, said arbitrary unit being notified, by a signal line, that said arbitrary unit is in said special state, thereby effecting one of controlling and stopping an interruption action of that one of the read and write operation being performed on said memory unit with auxiliary memory bits.

25. A data processing system comprising an arithmetic processing unit, an input/output processing unit, a first memory unit and a second memory unit with auxiliary memory bits, said second memory unit having a decoder for specifying an arbitrary number of data words and an arbitrary number of auxiliary memory bits in said second memory unit, wherein said auxiliary memory bits are used for selective controlling and stopping an interruption action of both a read and write operation on accompanying data words and each of said data words is accompanied by a same number of auxiliary memory bits, said units being interconnected by a system bus, said first memory unit including user data and control data, said control data indicating specific specifications about handling said user data, and said first memory unit storing specific programs corresponding to said specific specifications, wherein when control data having specified contents is read, the processing executed hitherto is interrupted, and specific process programs are started, and after a specific processing is completed, the processing executed hitherto is resumed.

* * * * *